Figure 1:
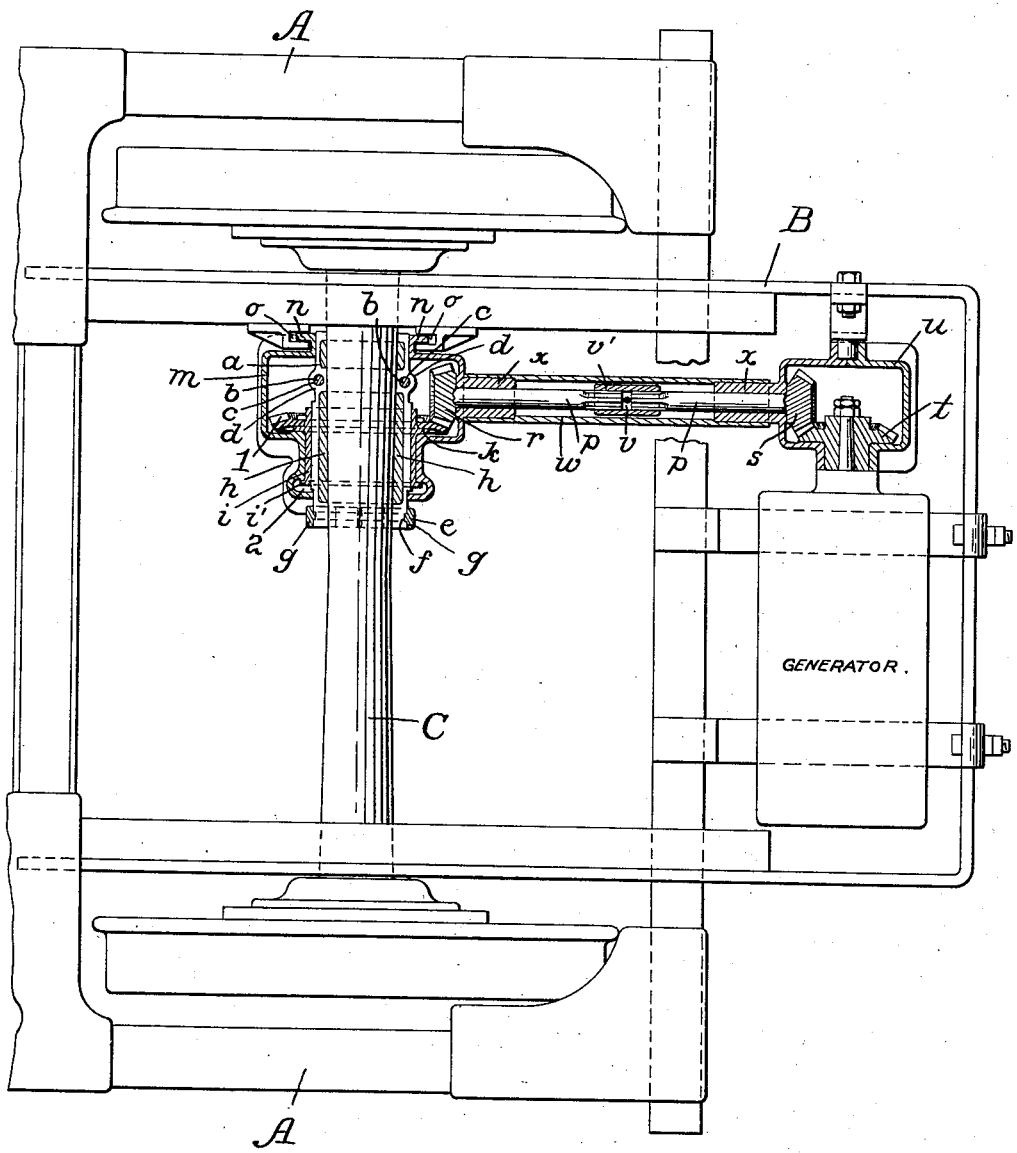

W. T. MARTERSTECK.
MEANS FOR TRANSMITTING POWER FROM THE AXLES OF RAILWAY CARS.
APPLICATION FILED APR. 28, 1911.

1,024,518.

Patented Apr. 30, 1912.

2 SHEETS—SHEET 1.

Attest:
Ewd L. Tolson
Edward N. Sarten

Inventor:
William T. Martersteck,
by Spear, Middleton, Donaldson & Spear
Attys.

W. T. MARTERSTECK.
MEANS FOR TRANSMITTING POWER FROM THE AXLES OF RAILWAY CARS.
APPLICATION FILED APR. 28, 1911.
1,024,518.
Patented Apr. 30, 1912.
2 SHEETS—SHEET 2.
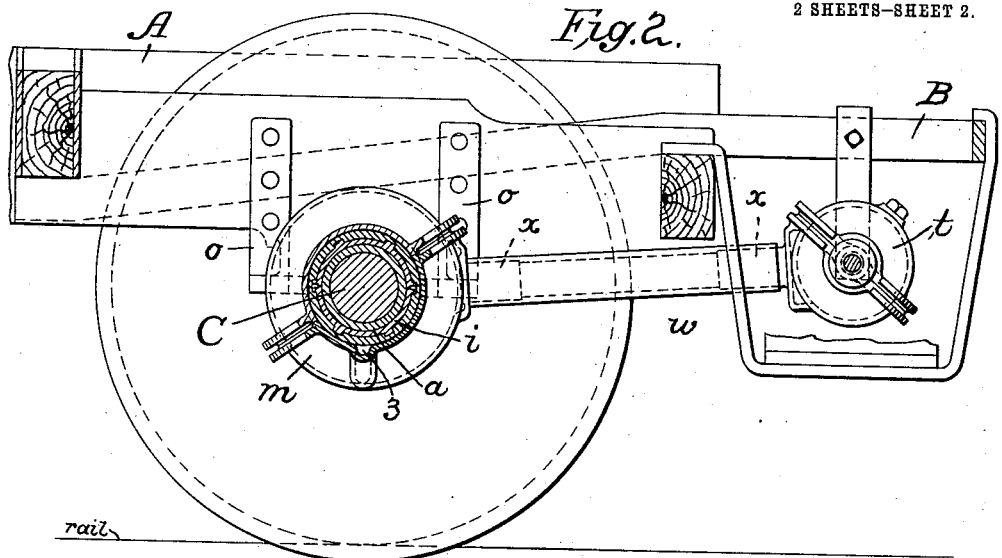
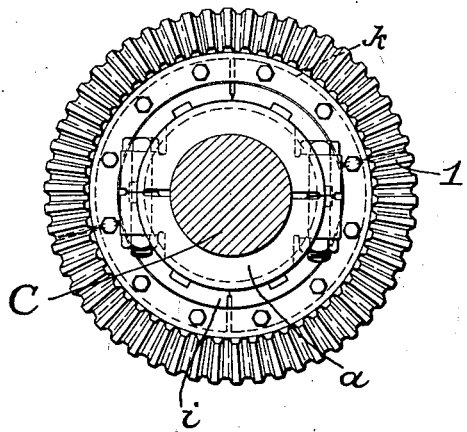
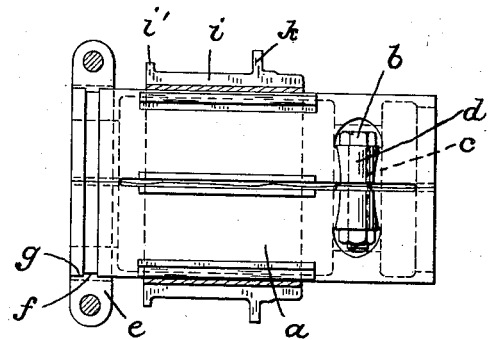
Attest:
Ewd L. Tolson
Edward N. Saxton
Inventor:
William T. Martersteck,
by Spear, Middleton, Donaldson & Spear
Attys.

UNITED STATES PATENT OFFICE.

WILLIAM T. MARTERSTECK, OF SHARON, PENNSYLVANIA.

MEANS FOR TRANSMITTING POWER FROM THE AXLES OF RAILWAY-CARS.

1,024,518.     Specification of Letters Patent.     Patented Apr. 30, 1912.

Application filed April 28, 1911. Serial No. 623,930.

*To all whom it may concern:*

Be it known that I, WILLIAM T. MARTERSTECK, citizen of the United States, residing at Sharon, Pennsylvania, have invented certain new and useful Improvements in Means for Transmitting Power from the Axles of Railway-Cars, of which the following is a specification.

My invention is designed to provide effective means for transmitting power from the axle of railway cars to an electric generator, the current being utilized for lighting or other purposes. I have aimed to secure a positive drive between the axle and the generator and at the same time meet all the conditions as to flexibility.

My invention consists of a positive driving connection between the axle and generator with means intermediate of the axle and the shaft of the generator for allowing flexibility of the parts so as to permit of vertical, lateral and longitudinal movement in the connections.

I have illustrated the invention in the accompanying drawing in which—

Figure 1 is a plan view partly in section, showing the frame and generator with the driving connections in section. Fig. 2 is an elevation of the frame showing the position of the generator and axle. Figs. 3 and 4 show details of construction.

In Figs. 1 and 2 the truck frame at A and B is of usual construction and needs no particular description. The axle C is also of ordinary construction and indeed it is essential that the standard equipment of railways be utilized in any additions thereto as in the present instance, and I have aimed to apply my improvements to the ordinary equipment without requiring any change therein.

In carrying out my invention I plan to get all the advantages of the direct driving connection between the axle and the generator and to make this connection dust proof and at the same time flexible in order to permit of sliding and rocking movements between the various parts constituting the drive, in relation to each other, without sacrificing anything as to strength or durability of the connections.

Referring particularly to Fig. 1, I show at $a$, a split sleeve, the two parts being adapted to encircle the axle and to be secured thereon by bolts $b$ passing through openings $c$ in ears $d$ toward the front of the sleeve, the rear ends of the sleeve being held by a collar or ring $e$ made of split parts and having an interior projection $f$ forming annular recesses $g$, and into one of these recesses the ends of the sleeve project, the parts of the collar $e$ being held in place by bolts passing through projecting ears. It will be observed that there is space provided at $h$ between the axle and the inner periphery of the sleeve $a$, and this space is filled with Babbitt metal. I provide a second sleeve $i$ which turns with sleeve $a$, which in turn rotates with the axle, but the sleeve $i$ has longitudinal movement on the sleeve $a$ so as to provide for the lateral play necessary. I secure this longitudinal or lateral movement by providing the sleeve $a$ with fins or projections extending longitudinally of its periphery fitting in keyways or recesses in the inner face of the sleeve $i$, thus securing rotation of the sleeve $i$ with the sleeve $a$, but permitting a limited amount of longitudinal movement of the sleeve $i$ relatively to the sleeve $a$. The sleeve $i$ is provided with projecting flange $k$ which affords a support for a rim gear $l$, this gear being bolted or otherwise secured to the flange, and it is through this gear $l$ that the rotation of the axle is communicated to the shaft of the generator by connections hereinafter described. A casing $m$ makes a dust-proof connection around the parts described and contains the lubricant, fitting closely the sleeve $i$ at one end where it is held between the flange $k$ and the flanged end of the sleeve as shown at $i'$, the extreme inner end of the casing being turned in to bear against the sleeve $a$. This casing is extended to the front around the gear $l$ fitting closely the front end of the sleeve $a$ and having outwardly turned flanges $n$, fitting guide-ways $o$, supported on the frame and permitting limited up and down movement under the ordinary action of the usual springs. The casing $m$ is adapted to permit of circulation of the lubricant through the space 2 and the channel 3, shown in Fig. 2, extending from the spaces 2 to the main chamber of the casing. The casing $m$ supports the inner end of the communicating driving shaft $p$ which carries a bevel gear $r$, meshing with the gear $l$, and at its opposite end the shaft $p$ carries a bevel gear $s$ meshing with the bevel gear $t$. The bevel gears s and t are covered by a casing u. The shaft p is divided preferably centrally as at v, being supported by a sleeve v' coupling together the two ends of the shaft, these ends being provided with splines fitting corresponding grooves or ways in the sleeve v', thus permitting of the necessary extensibility of the shaft in the vertical movement of the casing and axle relative to the fixed position of the generator. In order to make this construction dust proof I provide a sleeve w which covers the shaft p, this sleeve extending between tubular projections x, of the gear casings and having sliding connections at one or both ends so as to give the necessary amount of movement to allow the required vertical movement of the axle and casing in relation to the frame.

It is well known that there is not only a vertical movement of the parts, but this movement is sometimes in the nature of a rocking motion and this rocking movement is provided for by my construction in the use of bevel gears arranged laterally of the axle so that up and down rocking motion simply cause the gears to roll one upon the other.

It will be understood that the generator is representative of not only an electrical apparatus but of a fan, air compressor or other device which requires to be rotated from the axle.

What I claim is:—

In combination with the axle of a railway car and the shaft of a device to be driven, a positive transmission between the two including a bevel gear encircling the axle, a transmitting bevel gear engaging the same to one side of the axle, the said gear having rolling connection with said axle gear, connections between the gear and the part to be driven, the axle gear having longitudinal movement on the axle and vertical movement therewith, substantially as described.

In testimony whereof, I affix my signature in presence of two witnesses.

WILLIAM T. MARTERSTECK.

Witnesses:
 L. B. MIDDLETON,
 EDWARD N. SARTEN.

Copies of this patent may be obtained for five cents each, by addressing the "Commissioner of Patents, Washington, D. C."